(No Model.)

J. W. OGDEN.
VALVE OPERATING MECHANISM.

No. 486,263. Patented Nov. 15, 1892.

WITNESSES:
Chas. Nida.
[signature]

INVENTOR:
John W. Ogden
BY [signature]
ATTORNEY.

UNITED STATES PATENT OFFICE.

JOHN W. OGDEN, OF BROOKLYN, NEW YORK.

VALVE-OPERATING MECHANISM.

SPECIFICATION forming part of Letters Patent No. 486,263, dated November 15, 1892.

Application filed February 29, 1892. Serial No. 423,289. (No model.)

*To all whom it may concern:*

Be it known that I, JOHN W. OGDEN, of Brooklyn, New York, have invented new and useful Improvements in Valve-Operating Mechanisms, of which the following is a description, reference being had to the accompanying drawings, which form a part of this specification.

My invention relates particularly to valves adapted to be used with gas or water pipes, and has for its purpose quickness of operation, together with sure and firm closure of the valve.

My invention is also applicable, as will hereinafter be seen, to water-gates and like apparatus.

To these ends my invention consists in the mechanism and its several parts constructed, arranged, combined, and used substantially in the manner herein described, illustrated, and claimed.

Figure 1:
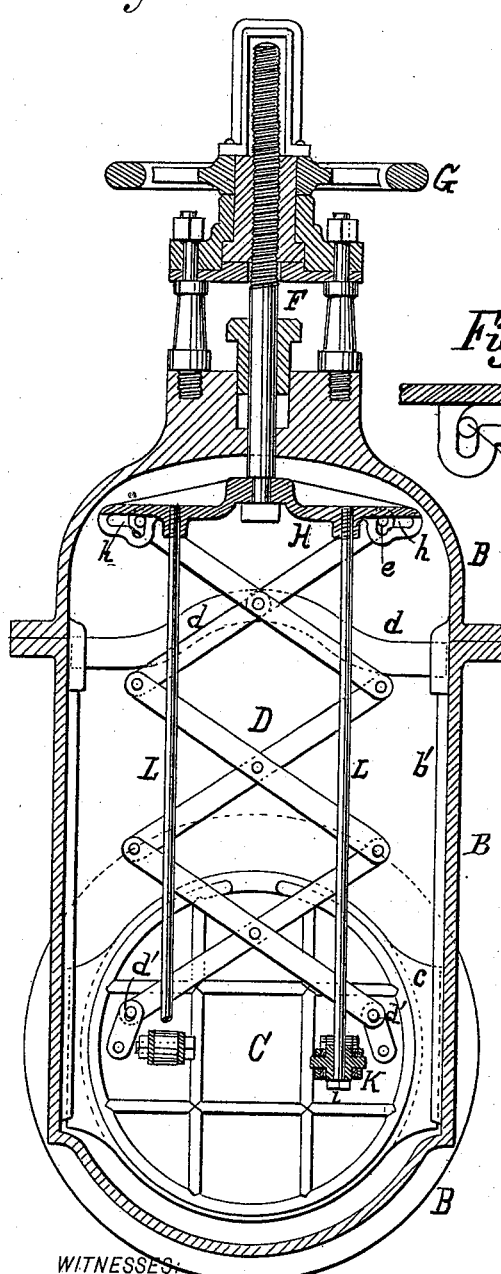
Figure 1A:
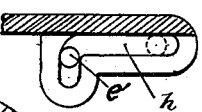
Figure 2:
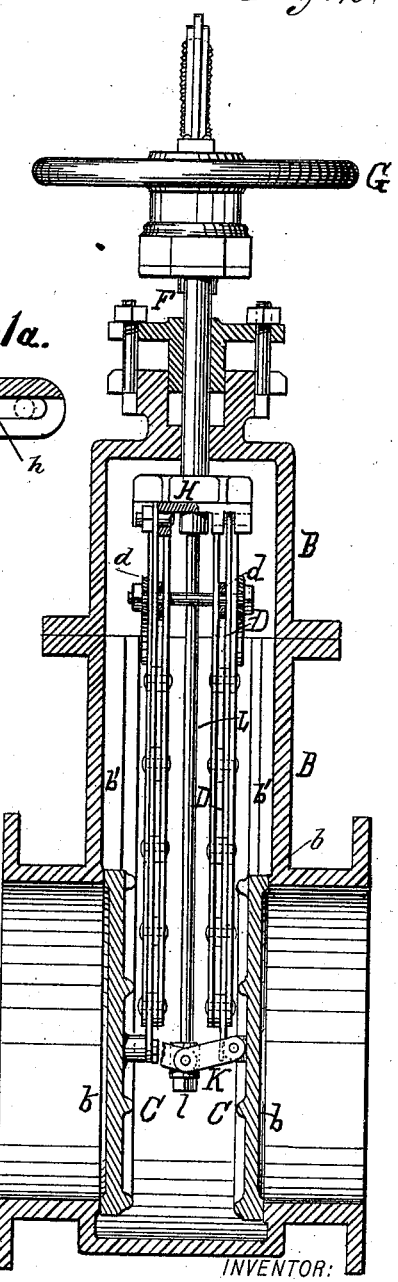

In the accompanying drawings, Figure 1 is a sectional view of one embodiment of my invention, looking in the direction of the flow of fluid. Fig. 1ª is a sectional view of the cross-head. Fig. 2 is a transverse section of the same.

Like letters of reference indicate like parts.

At B is shown the casing of my mechanism, provided with one or more valve-seats $b$.

At C, I show my valves in a closed position. To the rear of each valve is secured by links or otherwise the ends of a pair of lazy-tongs D. These lazy-tongs may be fulcrumed at a suitable point in the casing or upon a crosspiece $d$, secured to or formed integrally with the casing. The operating valve-stem F in my apparatus, which protrudes from the casing and may be actuated by the hand-wheel G in a well-known manner, carries at its lower end within the casing B a head H. The head H is provided with ways or slots $h$, in which travel the pins $e$, held in the operating end of the lazy-tongs. It will now be seen that as the head H is depressed by operating the hand-wheel G the upper ends of the lazy-tongs are forced downward and the pins $e$ travel outward along the slots $h$. By this operation the lower ends of the lazy-tongs are quickly raised, carrying with them the valve C.

I provide guides $b'$ within the casing B and along these guides run the guide-lugs $c$, carried on the valve C. In this manner the travel of the valve is restricted to its proper path.

To secure the firm closure of my valve when in position upon its seat, I provide toggles K, which where two co-operating-valves are used may react upon the other valve, but where a single valve is used a dummy valve or block must be provided to receive the reacting thrust of the toggles. The toggles are operated by one or more rods L, secured at their upper ends to the head H and at their lower sliding freely through the elbow of the toggle and terminating in the nut $l$. When the valves are raised by the lowering of the head H, the toggles slide freely upward upon the rods L; but during the closing of the valve at the moment the valves come in place upon their valve-seats the elbow of the toggle brings up against the head or nut $l$ of the rod L, and thereby the valves are firmly thrust against the seats and the valves firmly closed. It is clear that after the valves are brought in contact with their seats further motion from the lazy-tongs is impossible, yet further movement of the head H is required to exert greater thrusts by the toggles K. With many valves the resilience or "give" of the lazy-tongs is sufficient to permit this slight movement, but in others some provision must be made for it. Where the valve travels downward by its own weight a slot $d'$ will effect the necessary lost motion. Where, on the other hand, a positive movement is necessary I provide a continuation of the horizontal slots $h$ into the vertical plane, as shown more clearly in Fig. 1ª. This is so arranged that the pin $e$ will have reached the position indicated by $e'$ at the moment the toggles begin to act. In this position the further raising of the head H will cause the pin $e$ to travel down the slot without giving movement to the lazy-tongs and without thereby causing any movement of the valve. In this last construction no lost motion occurs and a positive operation for both opening and closing is obtained. In opening the valve the initial movement of the head H releases the toggles K by the depression of the rods L, and directly thereafter the raising of the valve by the lazy-tongs begins. With the lazy-tongs as shown the increase of motion by their use is five to one, so that to raise or lower a thirtyinch valve requires an entire motion for the valve-stem F of but six inches, with a very slight additional movement for locking the toggles.

It will be seen that the operation of my lazy-tongs and of my toggles may be simultaneous in part or may be successive, as last set forth, without departing from the principles of my invention. It must also be understood that with my lazy-tongs for raising or lowering the valves other mechanisms might replace the toggles for tightly thrusting the valves against their seats, and in like manner many modifications of details of my mechanism might be made without departing from my invention.

Having now fully set forth one form of my invention, I claim as my own, and desire to secure by these Letters Patent, the following:

1. In combination, in a valve or gate mechanism, a casing, a valve-seat therein, a valve or gate arranged to travel in guides in said casing, lazy-tongs for opening and closing the said valve, fulcrumed in the said casing and secured to the said valve, a movable head for operating the said lazy-tongs, toggles for forcing the said valve against the said valve-seat, an operating-rod for the said toggles secured to the said head, and means, as a wheel and screw, for actuating the said head, substantially as and for the purposes set forth.

2. In combination with the stationary parts of a valve or gate operating mechanism, a valve or gate, lazy-tongs for opening and closing the said valve or gate, toggles for forcing the said valve against its seat, an operating-rod pivoted to the elbow of the said toggles, and means, as a wheel and screw, for simultaneously actuating the said lazy-tongs and the said toggles, substantially as and for the purposes set forth.

3. In combination with the stationary parts of a valve or gate operating mechanism, a valve or gate, lazy-tongs for removing and replacing the valve or gate, toggles for tightly closing the said valve, and means of operating the said toggles and the said lazy-tongs, substantially as and for the purposes set forth.

4. In combination with the stationary parts of a valve or gate operating mechanism, a valve, a pair of lazy-tongs for opening and closing the said valve, a valve-stem connected with the said lazy-tongs, and means, as a wheel and screw, for actuating the said lazy-tongs, substantially as and for the purposes set forth.

5. In a valve-gate, the following elements in combination: a pair of gate-valves, one or more lazy-tongs, and an actuating rod or stem for operating the lazy-tongs and through them the valves or gates.

6. In a valve-gate adapted to close orifices for the admission or emission of fluids or gases, a system of lazy-tongs, levers, and an actuating hand-wheel and rod combined therewith, whereby the valves may be operated by the extension and contraction of said levers, as and for the purposes described.

In testimony whereof I have hereunto set my hand this 11th day of February, 1892.

JOHN W. OGDEN.

Witnesses:
G. M. PLYMPTON,
HAROLD BINNEY.

Correction in Letters Patent. No. 486,263.

It is hereby certified that in Letters Patent No. 486,263 granted November 15, 1892, upon the application of John W. Ogden, of Brooklyn, New York, for an improvement in "Valve-Operating Mechanism," an error appears in the printed specification requiring correction as follows: In line 64, page 2, the comma after the word "lazy-tongs" should be stricken out; and that the said Letters Patent should be read with this correction therein that the same may conform to the record of the case in the Patent Office.

Signed, countersigned, and sealed this 29th day of November, A. D. 1892.

[SEAL.]

CYRUS BUSSEY,
*Assistant Secretary of the Interior.*

Countersigned:
W. E. SIMONDS,
*Commissioner of Patents.*